United States Patent [19]

Jatteau et al.

[11] 4,079,257

[45] Mar. 14, 1978

[54] AUTOMATIC CONTROL SYSTEM FOR A SCINTILLATION CAMERA

[75] Inventors: Michel Jatteau, Lesigny; Joseph Pauvert, Ris Orangis, both of France

[73] Assignee: U.S. Philips Corporation, New York, N.Y.

[21] Appl. No.: 732,384

[22] Filed: Oct. 14, 1976

[30] Foreign Application Priority Data

Oct. 17, 1975 France .............................. 75 31868

[51] Int. Cl.² .............................................. G01T 1/20
[52] U.S. Cl. ................................ 250/363 S; 250/252; 250/369

[58] Field of Search ..................... 250/252, 363 S, 369

[56] References Cited

U.S. PATENT DOCUMENTS 3,255,195   12/1965   Scherbatskoy .................. 250/252 X Primary Examiner—Davis L. Willis
Attorney, Agent, or Firm—Frank R. Trifari; Henry I. Steckler

[57] ABSTRACT

A scintillation camera has photomultipliers and a number of auxiliary radioisotope sources to calibrate the photomultipliers. The calibration circuits can be either analogue or digital.

9 Claims, 12 Drawing Figures

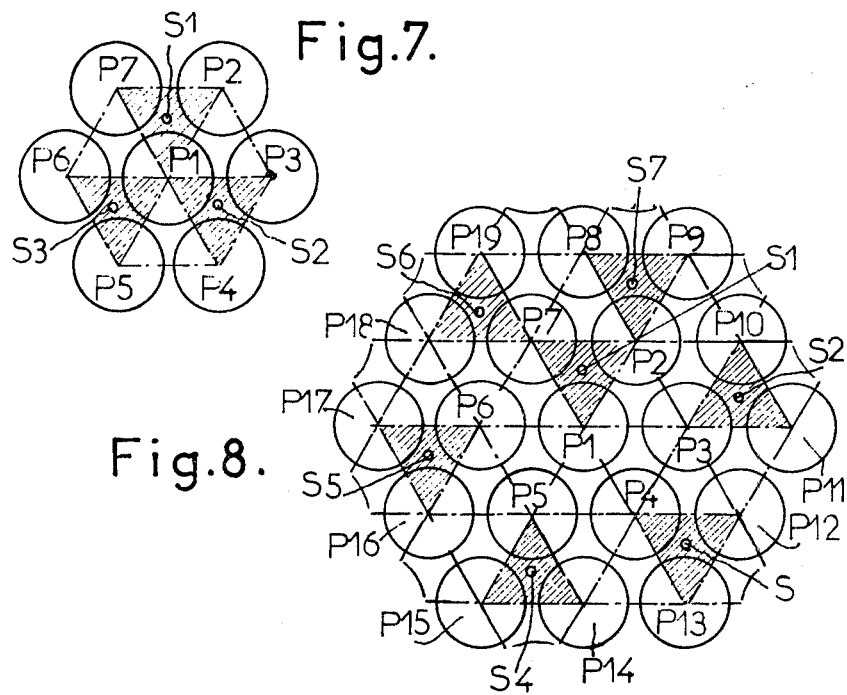

AUTOMATIC CONTROL SYSTEM FOR A SCINTILLATION CAMERA

The invention relates to an automatic control system, notably for a scintillation camera of the Anger type for making visible the intensity distribution of a radioactive isotope having a known radiation energy E in a body to be examined.

Scintillation cameras (gamma cameras) of the Anger type comprise an image pick-up head which is connected to a device for making visible the image, for example, a cathode-ray tube. The said image pick-up head comprises, accommodated in a suitable shield, a scintillation crystal, provided with a diffusive layer, and photomultipliers in a given configuration with at least one light conductor for the optical coupling of the said photomultipliers to the crystal. Due to the interaction of the incident γ-photons emitted by the body to be examined, scintillations occur in the material of the scintillation crystal. These scintillations are converted by the photomultipliers into electrical pulses having a mean amplitude which is dependent of the location and the intensity of the said scintillations.

The output signals of the photomultipliers are processed in a weighting network; the ordinates and the intensity of the converted and amplified scintillations are calculated and measured, after which the signals are applied to the cathode-ray tube in a localized manner.

The quality of the images obtained by means of scintillation cameras of the said type is limited. This is because any deviation of the image-determining parameters which occurs in the detection process gives rise to errors in the calculation of the ordinates of the scintillations and in the determination of the intensity of the scintillations. The said deviations occur in the intrinsic light yield of the scintillation crystal, in the optical properties of the diffusive layer, in the quality of the optical coupling between the crystal, the light conductor (conductors) and the windows of the photomultipliers, in the conversion yield of their photo-cathodes, and in the electronic amplification of the photomultipliers.

It has been found in practice that the camera must be repeatedly recalibrated. This recalibration consists, for example, of the balancing of the gains of the photomultipliers with homogeneous illumination of the entire configuration. This indispensable recalibration operation is usually performed prior to a series of examinations and once a day for given users and it disturbs the medical activities; moreover, it must be very carefully performed by users who usually have very little technical interest.

The invention relates to an automatic control system which eliminates the repeated recalibration by the user.

U.S. patent application Ser. No. 613,622 filed on Sept. 15, 1975, proposes to add the following components to the scintillation camera in order to obtain an automatic system for continuous calibration; an auxiliary device for the periodic formation of reference light signals, formed by an electroluminescent diode and a configuration of optical fibres which are integrated in spaces which remain open in the centre of each group of three photomultipliers of the photomultiplier configuration; the fibres, whose ends are in contact with a glass disk, form a light conductor between the crystal and the configuration of photomultipliers; circuits for signal processing which enable the gain of each of the photomultipliers to be adjusted on the basis of the reference signals.

The invention also relates to an automatic control system in which any deviations of all parameters which are important for the detection process can be taken into account, it not being necessary to add external components to the image pick-up device.

The automatic control system in accordance with the invention, intended for a scintillation camera for making visible, for example, the local distribution of a radioisotope having a radiation energy E in a body to be examined, the said camera comprising an image pick-up device with a scintillation crystal which is optically coupled to a configuration of a plurality of photomultipliers which are electrically coupled to a device for displaying signals, and being provided with an auxiliary radiation device having a radiation energy whereto the photomultipliers are sensitive, is characterized in that the said auxiliary radiation device continuously emits radiation by way of an isotope which is included therein and whose energy E′ ≠ E, the said device being fully integrated in the image pick-up device and being arranged relative to the assembly formed by the scintillation crystal, the light conductors and the photomultipliers so that in the crystal interaction regions occur which are distributed so that each photomultiplier is oriented towards such a region at a given angle, the circuits for signal processing being formed by a plurality of control circuits, each control circuit being associated with a photomultiplier, and means for discriminating the energy E′ and for adjusting the relevant photomultiplier as a function of on the one hand the number of interaction regions seen by the relevant photomultiplier and on the other hand of the opening of the said angle at which the region is seen.

Some preferred embodiments of the device in accordance with the invention will be described in detail hereinafter with reference to the accompanying diagrammatic drawing.

FIG. 1 is an axial longitudinal sectional view of the image pick-up device of a scintillation camera comprising an auxiliary radiation device and signal processing circuits in accordance with the invention, FIG. 2A is a cross-sectional view of the image pick-up device shown in FIG. 1, FIG. 2B is a longitudinal sectional view of a collimated source which can be used in a camera in accordance with the invention, FIG. 3 shows a circuit diagram of the signal processing circuits.

FIGS. 7, 8, 9 and 10 diagrammatically show sources distributed in configurations formed by 7 to 61 photomultipliers in an embodiment in accordance with the invention.

Figure 1:
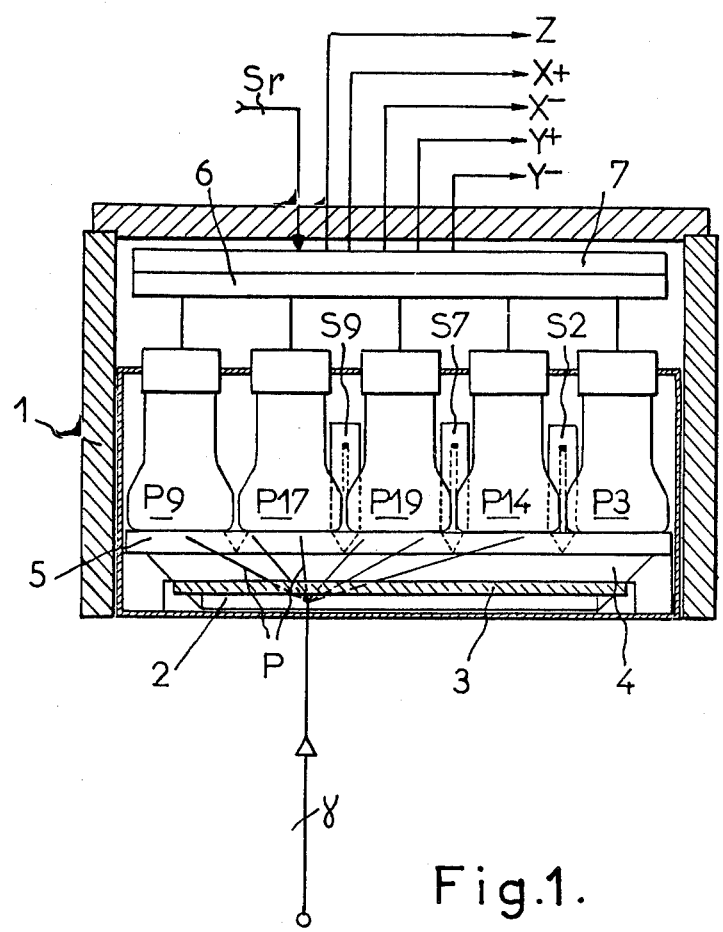

The embodiment of the image pick-up device shown in the FIGS. 1 and 2 comprises 19 photomultipliers P1 to P19 which are shown in FIG. 2; only five photomultipliers are shown in FIG. 1.

As is known, the said photomultipliers are disposed in a hexagonal configuration in a lead shielding unit opposite a scintillation crystal 2. The incidence of a γ-particle in the crystal material preferably produces visible p-photons which depart through a window 3 of the crystal housing and which reach, via a light conductor 4, the entrance of the photomultipliers which are provided with a light deflector 5.

A weighting network 6 on the one hand supplies signals having the ordinates X+, X−, Y+, Y− (these signals are formed, for example, in the manner described in the above said application), the said signals being transferred to the deflection system of the cathode-ray tube of the camera (not shown), and on the other hand a signal having an intensity Z.

A device for the continuous emission of radioactivity in the system in accordance with the invention is partly shown in FIG. 1. This device is formed by internal sources, such as S2, S7, S9, which are carefully collimated and which emit radiation beams of such a small section that interaction regions are obtained which are unambiguously localized in the scintillation crystal. The auxiliary sources are preferably monokinetic.

Figure 2A:
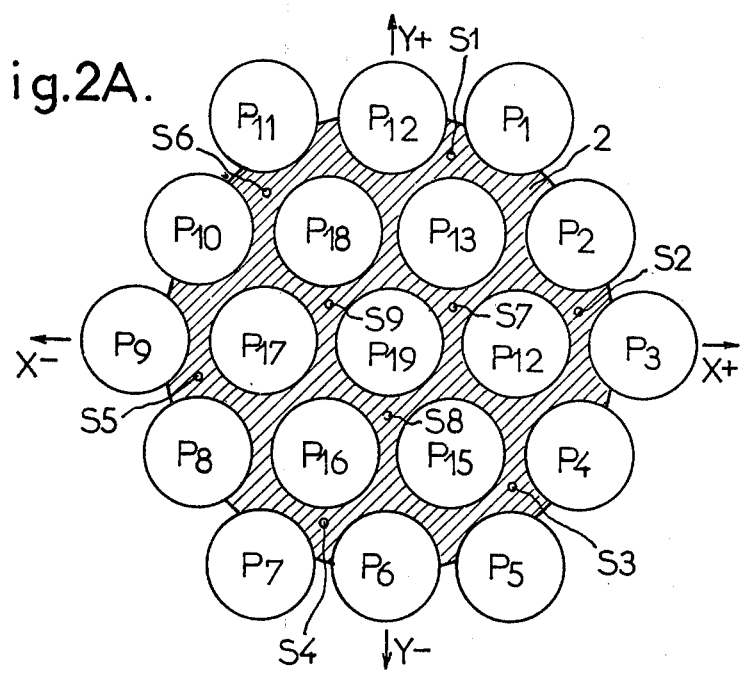
Figure 2B:
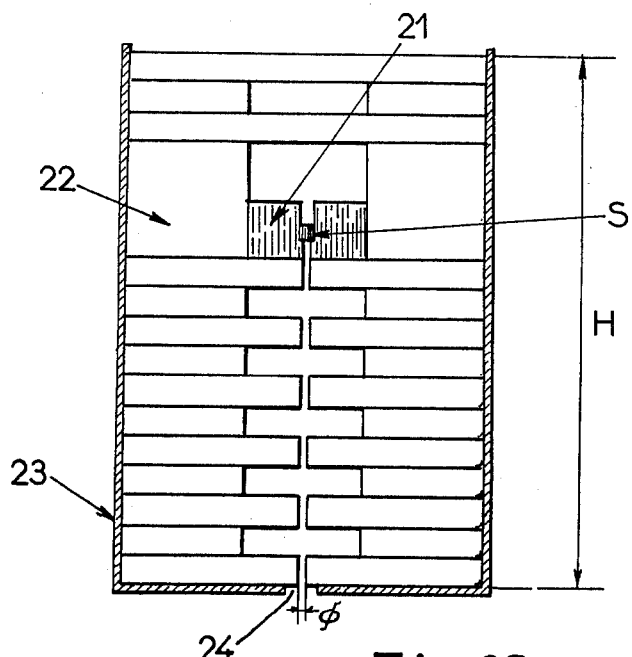

In a preferred embodiment of a collimated source as shown in FIG. 2B, a source S bears on a shoulder portion of a recess in a block 21 that can be made of a material sold under the trademark "Plexiglass" and is fixed in position by a disk 22 of tungsten, lead or an other metal having a heavy atomic weight. A sleeve 23 of stainless steel is provided with an opening 24, and disks of the assembly between the said opening and the source have apertures of different diameter in order to form traps for diffusive photons. A smallest one of the said diameters is very small and determines the section of the radioactive beam at the exit of the collimater.

The distribution of the internal sources is such that each photomultiplier "sees" at least one interaction region at a given angle which causes signals of the same amplitude A which is sufficient to control the control process in an effective manner. As is shown in FIG. 2, the sources can be simply arranged; for example, nine sources S1 to S9 are arranged so that each source is situated in the center of a group of three photomultipliers which form two concentric rows of three and six sources, respectively, between the three concentric rows of successively, one, six and 12 photomultipliers.

It has already been stated that the energy E' of the $\gamma$ photons emitted by the internal sources deviates from the energy E of the generally used radioisotopes for the gammagraphy examination. A distinction can thus be simply made between the signals which are used for controlling on the one hand and the signals which are detected for the actual examination on the other hand. The energy of the said radioisotopes amounts approximately of from 75 to 320° KeV ($Hg^{197}$: 75KeV to $Cs^{51}$ : 320 KeV). The radioisotope which is most often used in conjunction with the camera of the Anger type is the radioisotope $Tc^{199}$ (140 KeV).

Therefore, for the formation of the sources use can be made of the isotope $Cs^{137}$(662 KeV) which offers enough interaction probability in the scintillation crystal and which, moreover, ensures stability of these sources as a result of its very long active service life (30 years).

It appears from FIG. 2 that the scintillations formed in the scintillation crystal by one of the sources S1 to S9 are "seen" at the same angle by the nearest photomultipliers (for example, the scintillations produced by the source S1 are viewed by the photomultipliers P1, P12, P13). Thus, each of these multipliers on the average detects the same number of control signals N during a given period of time. By discrimination it is only possible to take into account the interactions where the energy of the $\gamma$ photons is fully absorbed. The mean amplitude A of mutually equally detected control signals, therefore, is the same for each of the said photomultipliers for the said signals if the response times of the photomultipliers are the same. However, as far as the unit formed by the photomultipliers for all detected control signals is concerned, the method of positioning the sources which is given by way of example leads on the average, in a given time interval, to 3N detected control signals for the photomultipliers P19, to 2N detected control signals for the photomultipliers P13 to P18, and to N detected control signals for the remaining photomultipliers.

Figure 3:
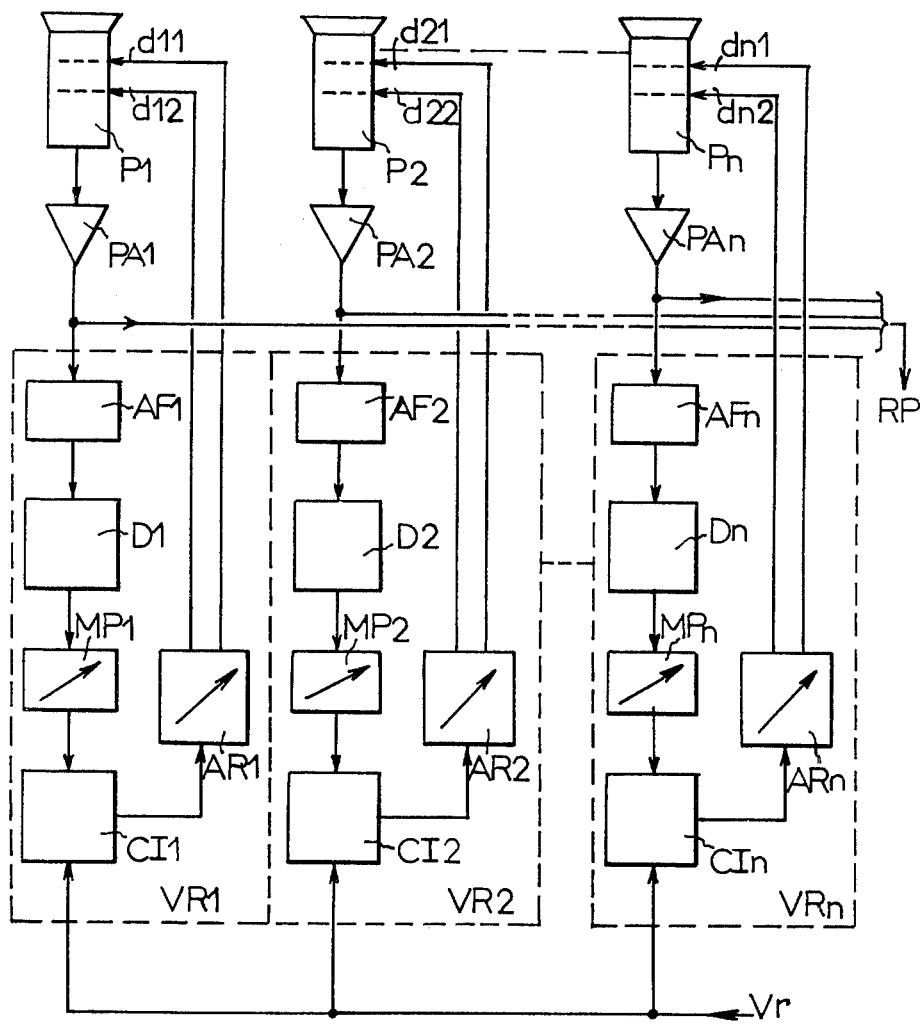
Figure 4:
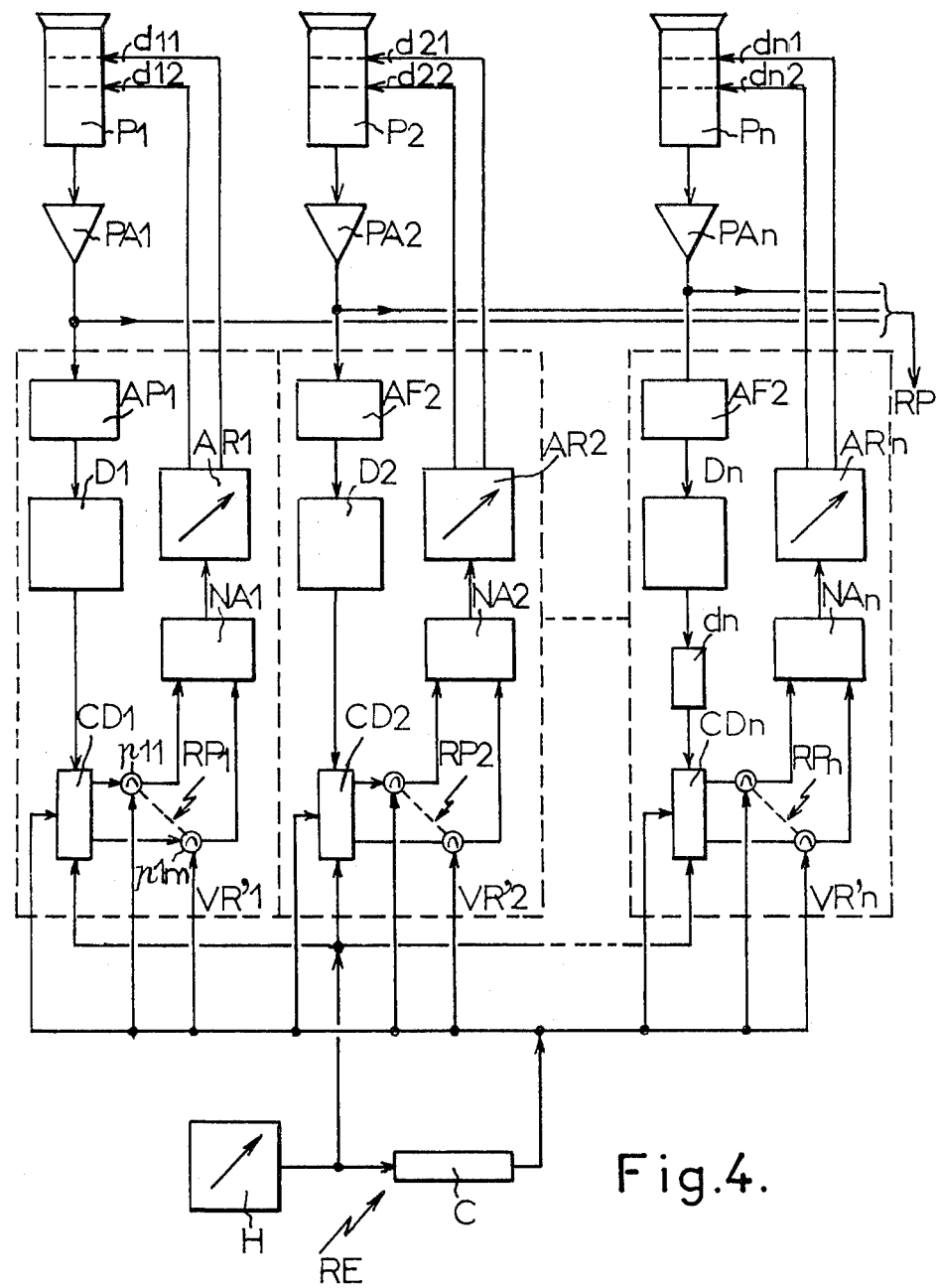
FIG. 4 shows an alternative for the circuit diagram shown in FIG. 3.

In scintillation cameras of the Anger type, each photomultiplier has associated with it a preamplifier which is coupled to a weighting network. FIGS. 3 and 4 show circuits which are connected to the input of the preamplifiers; the said circuits comprise a control traject or path for each photomultiplier. Each traject comprises at its input an amplifier stage and a signal converter for imparting the conventional shape to the signals. Only the photomultipliers P1, P2, . . . P$n$ are shown in both figures (the photomultiplier P$n$ corresponds to the photomultiplier P19 in the FIGS. 1 and 2). The relevant preamplifiers are denoted by the references PA1, PA2 and PA$n$. The output signals of these preamplifiers are applied on the one hand to the conventional weighting network (only the connections are shown and symbolized by RP), and on the other hand to the control trajects (VR1, VR2 and VR$n$ for FIG. 3 and VR'1, VR'2 and VR'$n$ for FIG. 4).

Each control traject in the circuit shown in FIG. 3 comprises the following components:

a shaping stage, for example, the stage AF1 which is coupled to the output of the preamplifier PA1, a threshold discriminator, for example, the threshold discriminator D1 which is coupled to the output of the shaping stage AF1, a shaping and weighting stage, for example, the stage MP1 which is coupled to the output of discriminator D1, an analog integrator/comparator, for example, the integrator/comparator CI1 which is coupled to the output of the stage MP1 and which also receives a reference signal V$r$, a control stage, for example, the stage AR1 which is coupled to the output of the integrator/comparator CI1 and which in the example shown influences the gain of the photomultiplier P1 with the traject VR1 is associated.

The stages AF1, AF2, . . . AF$n$ are conventional shaping stages; they integrate and differentiate, for example, the output pulses of the relevant preamplifier so that a better signal-to-noise ratio is obtained.

The upper threshold and the lower threshold of the threshold discriminators D1, D2, . . . D$n$ are determined in dependence of the energy of the $\gamma$ - control photons and of the desired sensitivity as regards variations of counting standards. The energy width of the selection region, determined by the said lower threshold and upper threshold, and the location of the said region with respect to the mean energy of the control signals, lead to more or less important variations of the counting standards in dependence of the deviation from the parameters which have an effect in the detection process. For example, if sources $Cs^{137}$ of 662 KeV are concerned, a selection region of between 640 and 680 KeV can be used.

The stages MP1, MP2, ... MPn, serving for the shaping and the weighting, supply pulses whose duration is calibrated in an amplitude ratio which is dependent of the number of interaction regions "seen" by the relevant photomultiplier. For example, if the image pick-up device comprises 19 photomultipliers which are distributed, together with the sources, as shown in FIG. 2, the weighting performed on the signal corresponding to a detected signal imparts amplitudes to the signals supplied by the stages MP1, MP2, ... MP19 (MPn) in the order of 1, 1, ⅓, because the photomultipliers P1, P2, ... P19 (Pn) "see" one, one and three, respectively, interaction regions, respectively, and count on the average N control signals, N control signals and 3N control signals, respectively, in a given time interval.

As has already been stated, one of the two inputs of the integrator/comparators CI1, CI2, ... CIn receives a reference signal $Vr$. This reference signal corresponds to the d.c. component of the signal corresponding to $N' = N$ detected control signals during an acquisition time interval which determines the integration period of the circuits CI1, CI2, ... CIn and which subsequently determines the control period of the system. Subsequently, the integrator/comparators CI1, CI2, ... CIn supply a continuous error signal which is proportional to the difference between on the one hand the number $N'$ (i.e., N) which serves as a reference and on the other hand the weighting number of detected signals after the adapted conversion.

In this embodiment, the control circuits AR1, AR2, ... ARn are programmable power supply circuits which influence the potential difference between the dynodes $d11$ and $d12$, $d21$ and $d22$, ... $dn1$ and $dn2$ of the relevant photomultipliers in dependence of the error signal received by these dynodes, so that this error signal is reduced to zero, with the result that the desired control is realized. The sensitivity of the said control circuits is determined by the precision required for automatic control.

Figure 5A:
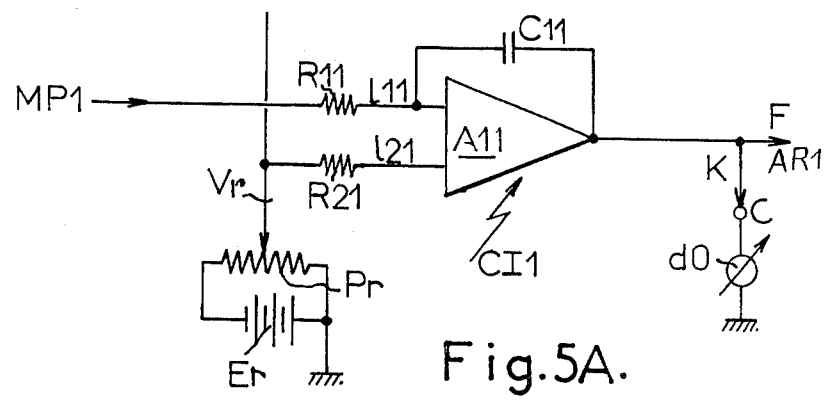
FIGS. 5A and 5B show two complementary diagrams for the circuit diagram shown in FIG. 3.

FIG. 5A diagrammatically shows an embodiment of an integrator/comparator which can be used for the embodiment shown in FIG. 3. The said integrator/comparator is formed by an operational amplifier A11 which is used as an integrator due to the feedback capacitor C11, the input L11 being connected, via a resistor R11, to the output of the shaping and weighting circuit MP1, whilst the input L21 is connected, via a resistor R21, to the wiper which forms part of the potentiometer Pr and whose position determines the reference voltage $Vr$.

This voltage is the result of the potentiometric division of a voltage $Er$, supplied by a source of d.c. calibration voltage (batteries, stabilised power supply circuits). The control of the voltage $Vr$ is achieved by reducing the output voltage of the integrator/comparator CI1 to zero, CI1 being connected, with a correct adjustment of the camera on the image plane in C, to a zero detector $d0$ by the switch K. The control of the said voltage $Vr$ can possibly be periodically repeated.

Figure 5B:
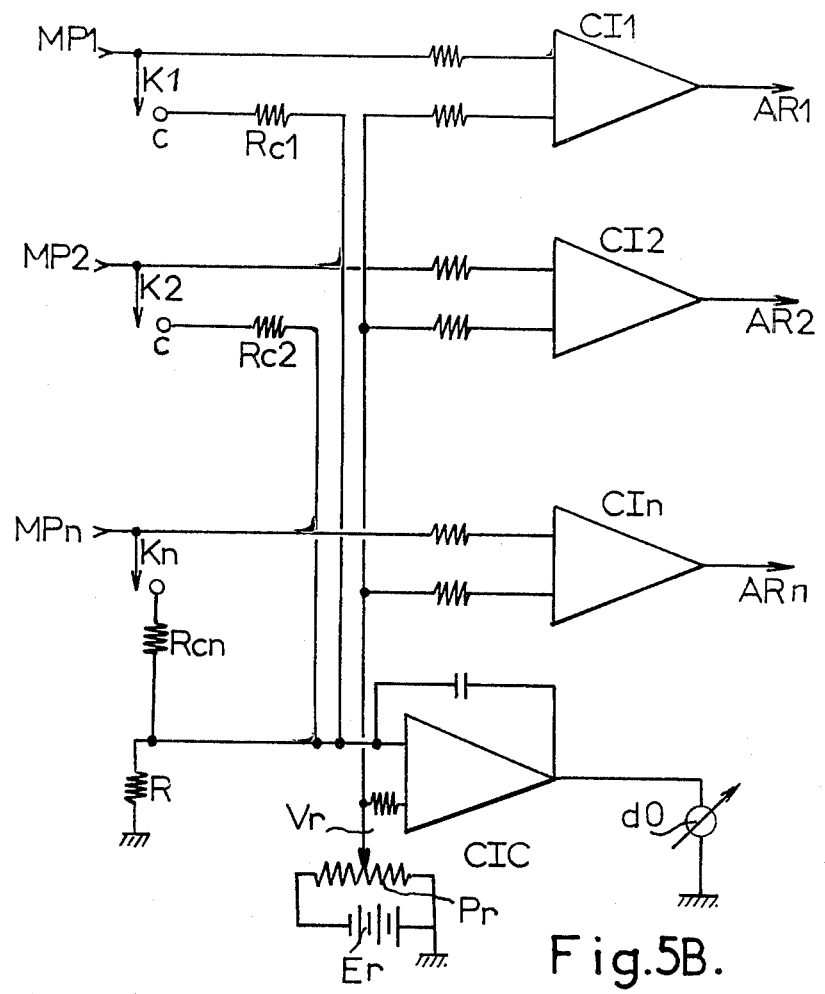

FIG. 5B shows an alternative embodiment which enables the reference voltage $Vr$ to be controlled on the basis of the total number of control signals. The calibrated pulses supplied by the photomultipliers MP1 to MPn are applied, via the switches K1 to Kn in the position C (calibration), to an integrator/comparator CIC via (voltage) dividers which are formed by the resistors $Rc1$, $Rc2$ to $RCn$, and the resistor R. The output of the circuit CIC is connected to a zero detector $d0$. The control of the reference voltage $Vr$ is effected in the described manner.

Due to the use of difference integration circuits, for example, by the insertion of a capacitor, identical to the capacitor C11, between on the one side the terminal L21 of the circuit shown in FIG. 5 and on the other side earth instead of the circuits CI1 to CIn, use can be made, in order to replace the reference voltage $Vr$, of a generator which supplies calibrated pulses whose frequency or amplitude is controlled in the same manner as the voltage $Vr$.

The counting interval or the integration period is adapted to various requirements. For example, when there are nine sources S1 to S9, formed by $Cs^{137}$ (662 KeV) as in FIG. 1, where each source has its own activity of approximately 15μCi and an apparent activity (collimated beam) of 2.5 $nC_i$, the mean number of signals $N_o$ equals $10$ $s^{-1}$. The probability of simultaneous appearance of information in the control trajects (dt ≈ a few μs) during the acquisition interval is approximately $10^{-4}$, which means that this probability is negligibly small. For counting periods of approximately 10 minutes, for example, in the control trajects, the mean number of control signals amounts of from 3000 to 9000, depending on the photomultipliers used; this implies good control precision (better than 2%). This precision can be substantially higher when the counting periods are substantially prolonged near the end of the control, so as to realise a smaller correction of the amplification, for example, after each half hour. During clinical examinations the increase of random coincidence probabilities which are due to the presence of control signals is very small (≈ 0.03%), whilst the number of Compton signals originating from the interior sources for which the camera is sensitive is also very small (for example, if the camera operates at an energy of 140 KeV, the number of parasitic signals per second amounts to less than 20 for the entire field of examination treated).

FIG. 4 shows an alternative embodiment of the control circuits, given stages thereof being identical to the stages of the circuits shown in FIG. 1 (these stages are denoted by the same references). Thus, each photomultiplier (P1, P2, ... Pn) which cooperates with a control traject (VR'1, VR'2, ... VR'n) is coupled, via a preamplifier (PA1, PA2, ... PAn), to the said traject which comprises a shaping stage (AF1, AF2, ... AFn), a threshold discriminator (D1, D2, ... Dn) and a programmable power supply circuit (AR1, AR2, ... ARn) which influences the potential difference between the dynodes $d11$, and $d12$, $d21$ and $d22$, ... $dn1$ and $dn2$ of the said photomultiplier. The treatment, however, is now effected in a "digital" manner rather than the "analog" manner in the circuits shown in FIG. 3. This is because the output of the threshold discriminator has connected to it an up/down counter (CD1, CD2, ... CDn); in the traject VR'n the coupling is provided by way of a divider $dn$.

At the beginning of each counting period (which determines the time interval between two corrections), the up/down counter of each control traject is in a given counting position which corresponds on the one hand to the mean value of the values which can be indicated by the said up/down counter and on the other hand to a correct gain. One of the outputs of the said up/down counter receives the pulses derived from the scintillations "seen" by the relevant photomultiplier;

the second input of the said up/down counter receives the pulses supplied by a clock generator H which comprises a reference and sampling circuit RE which is common to all control trajects.

The reference frequency of the pulses supplied by the clock generator H can be controlled and corresponds in the present case to the rhythm of the control pulses supplied by the trajects assigned to the photomultipliers which detect, in a given time interval and without deviation, N signals as is the case for the photomultipliers P1 and P2 in a configuration of 19 photomultipliers as shown in FIG. 2A.

In the described method, the up/down counter records a mean value at the end of each counting period for an adjusted gain if the said gain has indeed been maintained; however, if the gain is not correct, the said up/down counter indicates a value which corresponds to the deviation derives from the difference between this value and the mean value. In the control traject VR'n, assumed to be the traject assigned to the photomultiplier P19 of FIG. 2, a divider dn is included which couples the threshold discriminator Dn to the up/down counter Cdn. In this case a three-coounter is concerned, because the photomultiplier P19 detects 3N signals in the case of N control signals detected by the photomultipliers P1 to P12. According to this method the conditions for counting as regards all control trajects are satisfied again (the function of the dividers in the circuits of FIG. 3 can be compared to the weighting function performed by the stages MP1, . . . MPn of the circuits of FIG. 3).

The evaluation of the counting periods is controlled by a ring counter C of the common circuit RE which receives the pulses supplied by the clock generator H. At the end of each counting period, the counter C on the one hand activates the transfer of the value indicated by the up/down counters to the digital-to-analog converters NA1, NA2, . . . NAn, via the coincidence networks RP1, RP2, . . . RPn (only two gates of these networks are shown in the figure, and only two gates of the network RP1 are denoted by the references p1l and p1m); on the other hand, when the counter C reaches the zero position again, it returns each up/down counter to the position which is represented by the mean value which corresponds to a correct gain and which has already been defined. The information supplied by the digital-to-analog converters is processed in the power supply circuits AR1, AR2, . . . ARn which, like in the circuits of FIG. 3, influence the dynodes of the relevant photomultipliers. The counter C, obviously, can be replaced by an arbitrary counting device which performs the same functions.

Figure 6:
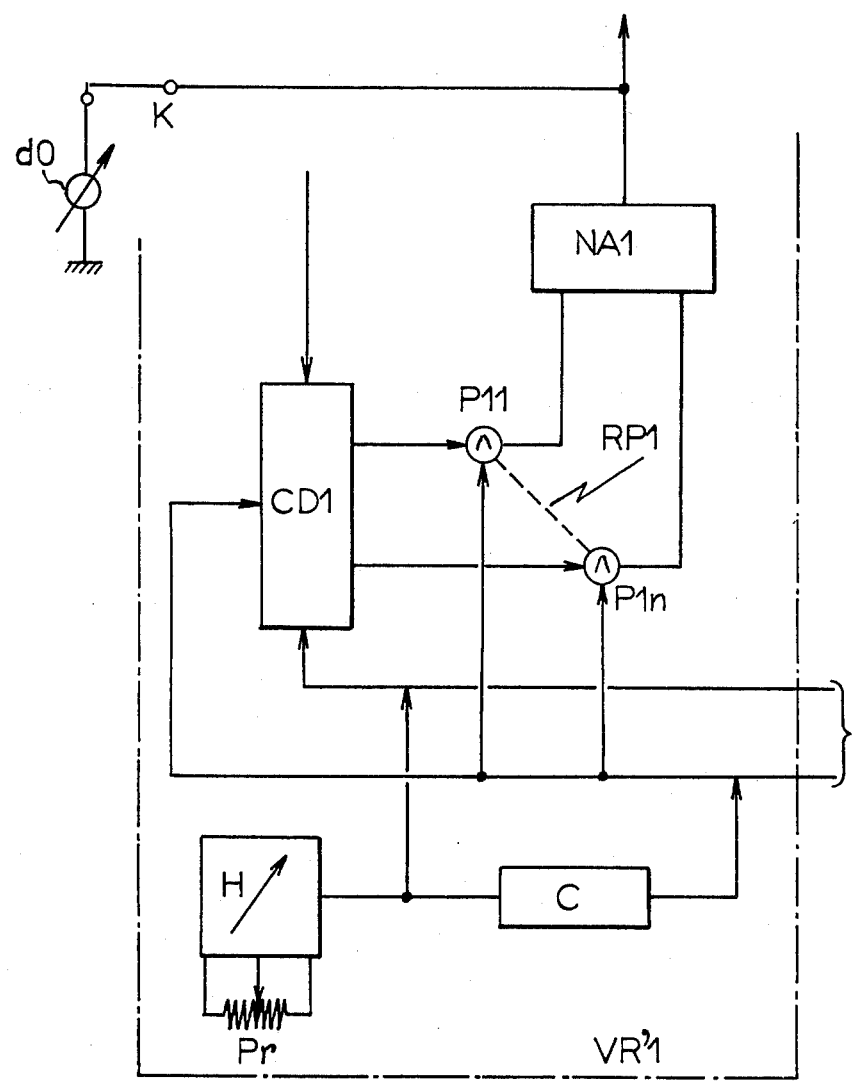
FIG. 6 shows a complementary diagram for that shown in FIG. 4.

FIG. 6 shows an example of the assembly formed by the circuits which can be used for controlling the reference frequency of the pulses supplied by the clock generator H when the traject VR1 is used as a calibration means. When the camera is adjusted to the image plane, the switch K connects the output of the converter NA1 to a zero detector d0, and the reference frequency is adjusted by means of the wiper of the potentiometer Pr so that the output voltage of the converter NA1 equals zero.

Instead of the traject VR1, it is possible to use either any arbitrary other traject VR'2 to VR'n, or, like for the alternative shown in FIG. 5B, all trajects.

Finally, it will be noted that the control system can possibly be disconnected during the conventional control of the image pick-up device. Disconnection can be very simply effected by means of a main switch (not shown in the figures) which counts the number of control trajects.

The proposed system offers the advantage that a fully integrated device provides the automatic correction for the gain of each of the n photomultipliers of a camera for gammagraphy. The mean response "energy of the gammaphotons/useful electric signal" is the same for each photomultiplier with a precision of approximately 1%. This is an essential condition in order to avoid given positioning errors of the scintillations during the image recording, and hence for obtaining a better image quality. The proposed system requires only the incorporation of radioactive sources having only a very limited intensity in the interior of the image pick-up device on the one hand, whilst on the other hand n comparatively simple control trajects are required which do not substantially affect the electronic circuits normally used in this typs of camera.

It has already been stated that the method shown in FIG. 2 is given merely by way of example. Obviously, there are many possibilities of realising the building in of the configuration formed by the sources. For example, there is an approach which limits the number of sources to be used to a minimum. The methods diagrammatically shown in the FIGS. 7 to 10 satisfy this requirement and can be realized in an image pick-up device which has a hexagonal configuration and which is formed by 7, 19, 37 or 61 photomultipliers.

In the FIGS. 7 to 10 the photomultipliers are denoted by the references P1 to P7, P1 to P19, P1 to P37, P1 to P61, whilst the sources are denoted by the references S1 to S2, S1 to S7, S1 to S13, and S1 to S21 in an arbitrary sequence. This sequence need not be the same as the sequence chosen for FIG. 2; this choice is arbitrary, because the figures are given merely to clarify the relative numbers of photomultipliers and sources in the hexagonal configuration.

When the photomultipliers form a hexagonal configuration as is shown in the figures, the number of photomultipliers is of course dependent of the number r of concentric "rows" which enclose the central photomultiplier: for a single "row," the configuration comprises seven photomultipliers (FIG. 7); for two "rows," 19 photomultipliers (FIG. 8) are required; for three "rows," 37 photomultipliers are required (FIG. 9); and for four "rows" 61 photomultipliers (FIG. 10) are required. The number of photomultipliers each time equals the sum of the $(r + 1)$ first terms of an arithmetical progression (where r is the number of "rows") on the base 1 and ratio 6. The number of photomultipliers increases in accordance with the progression $1 + 6 + 12 + 18 + 24$. Therefore, in accordance with the equation:

$n$ (number of photomultipliers) $= 1 + [r(6 + 6r)/2]$, and after simplification:

$n = 1 + 3 (r + r^2)$ is obtained.

If the photomultipliers form a hexagonal configuration, the sources in accordance with the invention are distributed so that the interaction region determined by each photomultiplier is "seen" at the same angle by three photomultipliers. The photomultiplier P2 in FIG. 7, for example, obviously "sees" the interaction region which is determined by the source S2. In practice, however, the amplitude of the signals formed by the source S2 is insufficient to be taken into account by the control circuit cooperating with the photomultiplier P2.

In order to determine the minimum number of sources in a configuration comprising a given number of $n$ photomultipliers, three conditions are important:

$n$ equals (1 + a multiple of 3), a "row" comprises an even number of multipliers the difference between on the one hand the number of photomultipliers of the "row" having the rank ($r$ − 1) and on the other hand half the number of photomultipliers of the "row" having the rank $r$ equals half the number of photomultipliers of the "row" having the rank ($r$ − 2).

Figure 10:
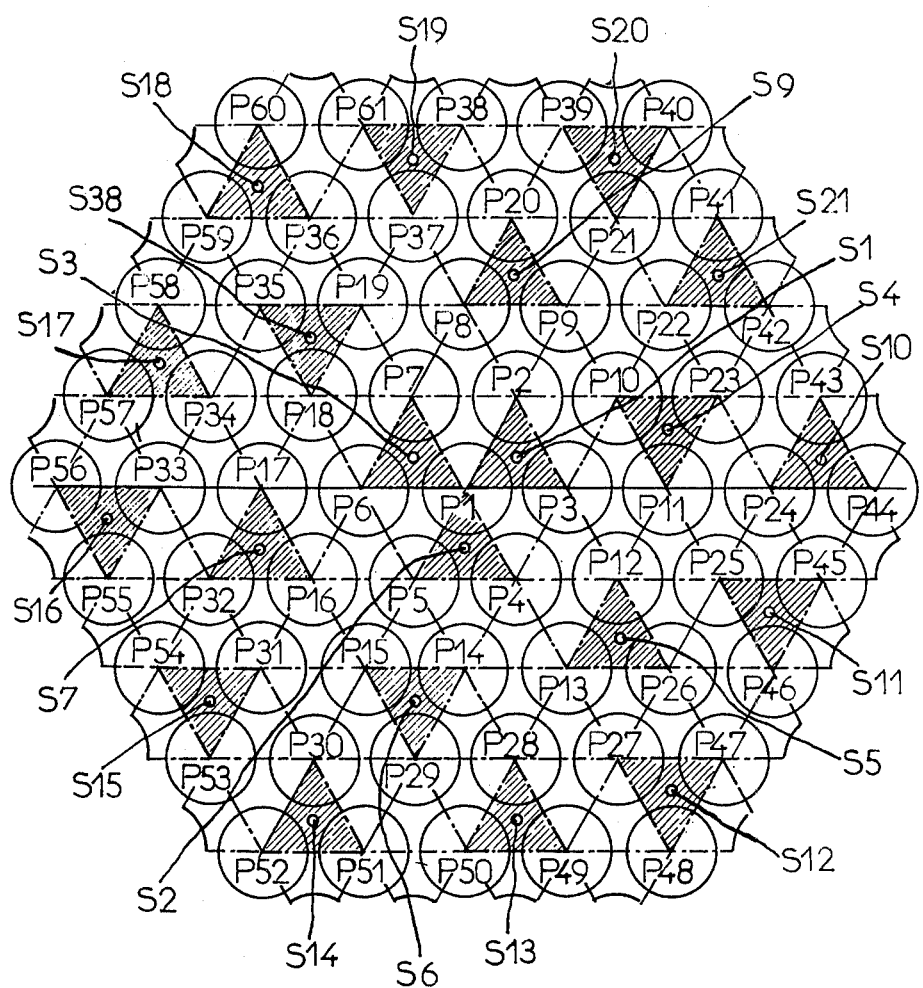

It is thus possible to distribute the sources in accordance with a hexagonal configuration, each "row" of which is situated between two adjoining "rows" of photomultipliers, so that for each group of two photomultipliers the photomultipliers of a "row" "see" an interaction region (obviously, at the same angle) which is "seen" by a photomultiplier of the preceding "row" (this is the case, for example, in the fourth "row" of FIG. 10). Because the number of photomultipliers equals (1 + a multiple of 3), one of the said photomultipliers will "see" three interaction regions (FIGS. 7 and 10) or two of the said photomultipliers will "see" two interaction regions (FIGS. 8 and 9), whilst the other photomultipliers "see" only a single interaction region.

As will appear from the following, the minimum number of sources equals $[(n + 2)3]$:

FIG. 7, in which $n = 7$; number of sources $= (7 + 2)/3 = 3$ (these sources are denoted by the references S1 to S3), FIG. 8, in which $n = 19$; number of sources $= (19 + 2)/3 = 7$ (these sources are denoted by the references S1 to S7, FIG. 9, in which $n = 37$; number of sources $= (37 + 2)/3 = 13$ (these sources are denoted by the references S1 to S13)

FIG. 10 in which $n = 61$; number of sources $= (61 + 2)/3 = 21$ (these sources are denoted by the references S1 to S21).

It may be stated that in the four cases shown the photomultipliers "see" a single interaction region, except:

in FIGS. 7 and 10 where the photomultiplier P1 "sees" three interaction regions, FIGS. 9 and 10 where the photomultipliers P2 and P7 "see" two interaction regions.

Obviously, the invention is not restricted to a given geometry of the configurations of photomultipliers and sources or to the choice of an element whereby the control is realised; the error signal can possibly be processed so that it influences every element of the detection network assigned to each photomultiplier. The range of application of the invention also covers any control system for image pick-up devices in which photomultipliers or other detection devices are used in an analysis system for radiation of gamma particles or any other particles.

What is claimed is:

1. An automatic control system for a scintillation camera for making visible on a display device the local distribution of a radioisotope having a radiation energy E in a body to be examined, the said camera comprising an image pick-up device having a scintillation crystal, a configuration of a plurality of photomultipliers which are optically coupled to said crystal and adapted to be electrically coupled to said device for displaying signals, and an auxiliary radiation device having a radiation energy to which the photomultipliers are sensitive, said auxiliary radiation device including isotope means for continuously emitting radiation and which is included therein and whose energy E' $\neq$ E, the said radiation device being fully integrated in the image pick-up device and being arranged relative to the assembly formed by the scintillation crystal, the light conductors and the photomultipliers so that in the crystal interaction regions occur which are distributed so that each photomultiplier is oriented towards such a region at a given angle; and circuits for signal processing comprising a plurality of control circuits, each control circuit being coupled to a respective photomultiplier and including means for discriminating the energy E' and for adjusting the relevant photomultiplier as a function of the number of interaction regions seen by the relevant photomultiplier and the opening of the said angle at which the region is seen.

2. An automatic control system as claimed in claim 1, wherein the device for continuously emitting radioactivity comprises a configuration of $m$ radioactive sources which comprise a collimator and which are arranged so that the radiation beams of the said sources are directed towards the scintillation crystal surface opposite the photomultipliers, the points of incidence of the said radiation beams on the said surface being situated in the middle between the projections of adjoining photomultiplier windows.

3. An automatic control system as claimed in claim 2, wherein said photomultipliers comprise $n$ photomultipliers arranged in groups of five in a hexagonal configuration of $r$ concentric rows which enclose a central photomultiplier, so that $n = 1 + 3 (r + r^2)$, and the radioactive sources are arranged so that the point of incidence of the radiation beam of each source is situated in the center of a surface whose boundary determines the projection of three adjoining photomultipliers.

4. An automatic control system as claimed in claim 1 wherein the processing circuits further comprise means for forming a reference signal (V$r$) which is characteristic of the mean number N$r$ of scintillations caused during a given time interval ($t$) in a given number ($v$) of interaction regions, each of the control circuits comprising a threshold discriminator coupled to a respective photomultiplier which selects the scintillations caused by a radioisotope having the energy E', a weighting stage means coupled to said discriminator for converting signals supplied by the relevant photomultiplier into signals $(sp/vp)v$, $vp$ being the number of interaction regions seen by this photomultiplier, a comparison stage coupled to said weighting stage and said forming means which receives the signals V$r$ and $(sp/vp)v$, and a control stage means which receives the signal formed in the comparison stage for changing as a function thereof the transmission characteristics of the relevant photomultiplier.

5. An automatic control system as claimed in claim 4, wherein the control circuits are analog circuits, the reference signal V$r$ being a monotonic signal whose amplitude is determined at the end of the time interval $t$ by the number of scintillations N$r$ and the number of interaction regions $v$, the weighting stage including means for changing in the ratio $v/vp$ the amplitude of the pulses supplied or to be supplied by the relevant photomultiplier generated by the scintillations detected thereby, the comparison stage including an amplitude comparison device and an integration network coupled between said comparison device and said weighting stage.

6. An automatic control system as claimed in claim 4, wherein the control circuits are digital circuits, the reference signal $Vr$ being a pulsed signal whose frequency is dependent of the number of scintillations $Nr$ in a number of interaction regions $v$ during the time interval $t$, the weighting stage including a divider means for changing in the ratio $v/vp$ the frequency of the pulses originating from the relevant photomultiplier, the comparison stage including an up/down counter having a mean presetting, this counter being readjusted again at the end of each time interval $t$, a digital-to-analog converter coupled to said control stage, and a coincidence network which conducts during the readjustment of the said up/down counter coupled between said counter and said converter.

7. An automatic control system as claimed in claim 5, wherein said reference signal forming means comprises a calibration circuit which comprises a potentiometer and a direct current voltage source which is connected between the terminals of the said potentiometer, the wiper of which provides the said reference signal, the control of the position of the wiper of said potentiometer being performed at least once while the camera is correctly adjusted to the image plane, the said control being effected either by reducing an output voltage to zero on a zero detector of an integrator/comparator which comprises the integrating network and the comparison stage of the control circuit, or by reducing to zero an output voltage on a zero detector which is supplied by the output of the calibration integrator/comparator which is temporarily connected to the output of the weighting stages of the control circuits.

8. An automatic control system as claimed in claim 6, wherein the reference signal forming means comprises a calibration circuit which comprises a clock pulse generator whose output supplies the said reference signal, and potentiometer means coupled to said clock for controlling the frequency of the pulses supplied by the said clock pulse generator, the said potentiometer being adjusted at least once while the camera is correctly adjusted to the image plane, an output voltage on a zero detector supplied by the output of the digital-to-analog converter of a control circuit being reduced to zero.

9. An automatic control system as claimed in claim 6, wherein the means for forming the reference signal comprises a clock pulse generator which is directly coupled to the up/down counter of each control circuit, and a ring counter which is controlled by and coupled to the clock pulse generator and which comprises $Nr$ positions, the said ring counter being coupled on the one side to the coincidence network and on the other side to the up/down counter of each control circuit for the transfer of the contents of this up/down counter to the digital analog converter as well as for resetting the up/down counter to its preset position.

* * * * *